(12) United States Patent
Wasley

(10) Patent No.: US 11,674,391 B2
(45) Date of Patent: Jun. 13, 2023

(54) FRICTION STABILIZER

(71) Applicant: Jason Wasley, Duncraig (AU)

(72) Inventor: Jason Wasley, Duncraig (AU)

( * ) Notice: Subject to any disclaimer, the term of this patent is extended or adjusted under 35 U.S.C. 154(b) by 0 days.

(21) Appl. No.: 17/632,070

(22) PCT Filed: Aug. 6, 2020

(86) PCT No.: PCT/AU2020/050813
§ 371 (c)(1),
(2) Date: Feb. 1, 2022

(87) PCT Pub. No.: WO2021/022338
PCT Pub. Date: Feb. 11, 2021

(65) Prior Publication Data
US 2022/0316335 A1   Oct. 6, 2022

(30) Foreign Application Priority Data

Aug. 6, 2019  (AU) ................................ 2019902814
Oct. 15, 2019  (AU) ................................ 2019903893

(51) Int. Cl.
*E21D 21/00*  (2006.01)
(52) U.S. Cl.
CPC ......... *E21D 21/004* (2013.01); *E21D 21/008* (2013.01); *E21D 21/0033* (2013.01)
(58) Field of Classification Search
CPC . E21D 21/004; E21D 21/0033; E21D 21/008; E21D 21/0026
See application file for complete search history.

(56) References Cited

U.S. PATENT DOCUMENTS

| | | | | | |
|---|---|---|---|---|---|
| 2,349,075 | A | * | 5/1944 | Cole | ................. E02D 5/803 411/42 |
| 3,188,815 | A | * | 6/1965 | Novotny | ............... E21D 21/008 405/259.4 |
| 3,192,822 | A | * | 7/1965 | Genter | .................. E21D 21/008 411/44 |
| 3,236,146 | A | * | 2/1966 | Teeple, Jr. | ............. E21D 21/008 411/53 |
| 3,248,997 | A | * | 5/1966 | Teeple, Jr. | ............. E21D 21/008 411/53 |
| 3,303,736 | A | * | 2/1967 | Raynovich, Jr. | ....... E21D 21/008 411/26 |

(Continued)

FOREIGN PATENT DOCUMENTS

| | | |
|---|---|---|
| AU | 2012220457 B2 | 5/2017 |
| CN | 203702202 U | 7/2014 |

(Continued)

OTHER PUBLICATIONS

International Search Report from corresponding International Patent Application No. PCT/AU20/50813, dated Oct. 13, 2020.

*Primary Examiner* — Benjamin F Fiorello
(74) *Attorney, Agent, or Firm* — Kusner & Jaffe

(57) ABSTRACT

A friction stabilizer for supporting a rock ceiling in an underground mining environment is disclosed. The friction stabilizer has an external sheath and an internal rod. The internal rod is about 15% of the length of the external sheath. The internal rod has wedges at either end, arranged to engage with complementary wedges welded to the inside of the sheath.

17 Claims, 3 Drawing Sheets

(56) References Cited

U.S. PATENT DOCUMENTS

| | | | | |
|---|---|---|---|---|
| 4,305,687 | A * | 12/1981 | Parker | E21D 21/0046 |
| | | | | 405/259.4 |
| 4,413,930 | A * | 11/1983 | Calandra, Jr. | E21D 21/008 |
| | | | | 405/259.6 |
| 5,073,064 | A * | 12/1991 | Leonard | E21D 20/02 |
| | | | | 405/259.1 |
| 5,253,964 | A * | 10/1993 | Swemmer | E21D 20/00 |
| | | | | 411/79 |
| 5,584,464 | A * | 12/1996 | Whittaker | F16M 7/00 |
| | | | | 411/80 |
| 7,179,020 | B2 * | 2/2007 | Robertson, Jr. | E21D 21/008 |
| | | | | 405/259.4 |
| 9,829,026 | B2 * | 11/2017 | Andou | F16B 13/065 |
| 2006/0127189 | A1 * | 6/2006 | Hedrick | E21D 21/0033 |
| | | | | 405/259.1 |
| 2010/0021245 | A1 * | 1/2010 | Li | E21D 21/008 |
| | | | | 405/259.5 |
| 2011/0070048 | A1 * | 3/2011 | Robertson, Jr. | E21D 21/0086 |
| | | | | 411/360 |
| 2012/0014756 | A1 * | 1/2012 | Cai | E21D 21/0033 |
| | | | | 405/259.1 |
| 2012/0163924 | A1 * | 6/2012 | Rataj | E21D 21/0033 |
| | | | | 405/259.3 |

FOREIGN PATENT DOCUMENTS

| | | | |
|---|---|---|---|
| CN | 209557024 | U | 10/2019 |
| FI | 124908 | B | 3/2015 |
| GB | 596408 | A | 1/1948 |
| GB | 636334 | A | 4/1950 |

\* cited by examiner

FRICTION STABILIZER

FIELD OF THE INVENTION

The present invention relates to mechanical dynamic friction stabilizers used in underground mining operations.

BACKGROUND TO THE INVENTION

Friction stabilizers including a sheath and an internal bolt are well known in mining operations. An example of such a stabilizer or bolt is shown in U.S. Pat. No. 9,797,249 to Sandvik Intellectual Property AB.

An example of a prior art friction stabilizer is shown in FIGS. 1 and 2 of the accompanying drawings. FIGS. 1 and 2 show a prior art stabilizer 10 having a sheath 12 (which has a longitudinal slit 14) and an inner bolt 16.

The inner bolt 16 extends from an outer end 18 through a clamping plate 20 and into the sheath 12.

At or near an inner end 22 the bolt 16 is coupled to a wedge 24. The wedge 24 is arranged to engage with a fixed wedge 26 welded or otherwise attached to the sheath 12.

If there is a seismic event the clamping plate 20 is forced outwards. This creates a tensile force on the bolt 16. The wedging action of the wedge 24 against the fixed wedge 26 acts to dissipate this tensile force, preventing catastrophic collapse of the rock wall or ceiling into which the stabilizer 10 has been installed.

The present invention proposes an advance on this stabilizer.

SUMMARY OF THE INVENTION

According to one aspect of the present invention there is provided a friction stabilizer having an outer sheath and an internal rod, the sheath including at least a first internally directed fixed wedge and a second internally directed fixed wedge, the first and second fixed wedges being axially spaced from each other,
the first and second fixed wedges being oriented in opposing directions,
wherein the rod extends between the first and second fixed wedges;
the rod having a first end including a first engaging wedge and a second end having a second engaging wedge,
the arrangement being such that a tensile force applied to the sheath causes a wedging action of the first engaging wedge against the first fixed wedge and the second engaging wedge against the second fixed wedge.

The sheath may have a designated yield point located between the first and second fixed wedges. This may be a partial or complete cut through the sheath.

The sheath may have a third fixed wedge diametrically opposed to the first fixed wedge. The rod may have a third engaging wedge diametrically opposed to the first engaging wedge, such that the tensile force causes a wedging action of the third engaging wedge against the third fixed wedge.

The sheath may have a fourth fixed wedge diametrically opposed to the second fixed wedge. The rod may have a fourth engaging wedge diametrically opposed to the second engaging wedge, such that the tensile force causes a wedging action of the fourth engaging wedge against the fourth fixed wedge.

It is preferred that the internal rod is constructed from high tensile steel, having a diameter of at least 10 mm. In a preferred embodiment the internal rod has 20 mm diameter, and is formed from high tensile R20 threaded bar.

It is preferred that the internal rod is at least 100 mm in length. It is more preferred that the internal rod is at least 200 mm in length. In a most preferred embodiment, the internal rod may be in the order of 300 mm in length; that is, between 250 mm and 300 mm.

In an alternative embodiment the internal rod may be constructed from a twisted steel cable material, such as a 7-strand steel cable.

The sheath preferably has a diameter between 30 mm and 60 mm, with a wall thickness between 3 mm and 5 mm.

It will be appreciated that the sheath has an inner end and an outer end, the outer end being associated with a clamping plate. It is preferred that the first and second fixed wedges are both located closer to the inner end of the sheath than the outer end. It is preferred that the first fixed wedge is located within 10% of the sheath length from the inner end, and the second fixed wedge is located within 25% of the sheath length from the inner end.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings.

DETAILED DESCRIPTION OF PREFERRED EMBODIMENTS

Figure 1:
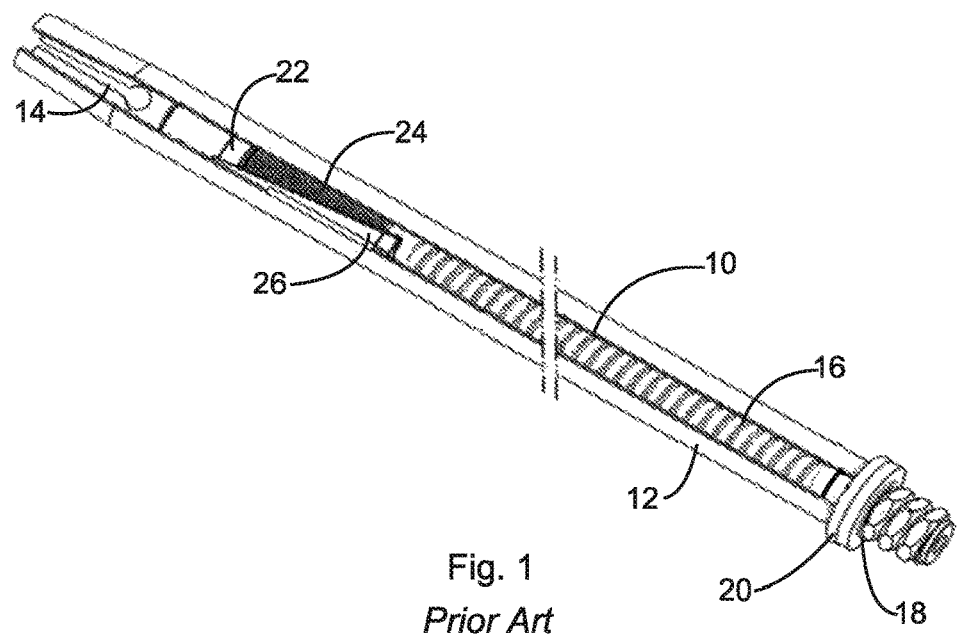
FIG. 1 is a schematic perspective of a prior art friction stabilizer
Figure 2:
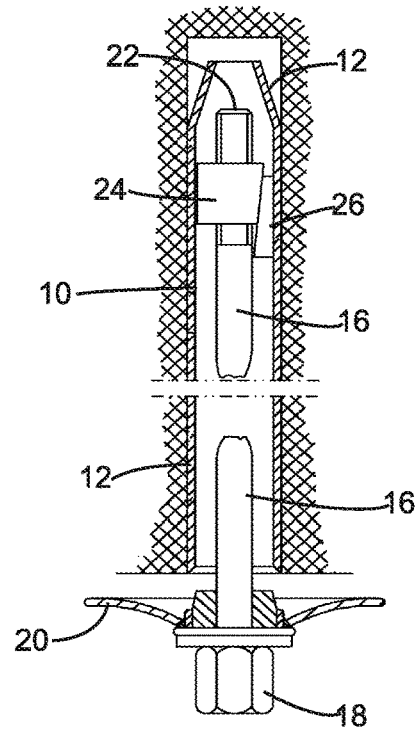
FIG. 2 is a schematic cross section of the prior art friction stabilizer of FIG. 1.
Figure 4:
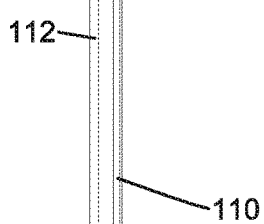
FIG. 4 is an enlarged view of an inner end of the friction stabilizer of FIG. 3.
Figure 4:
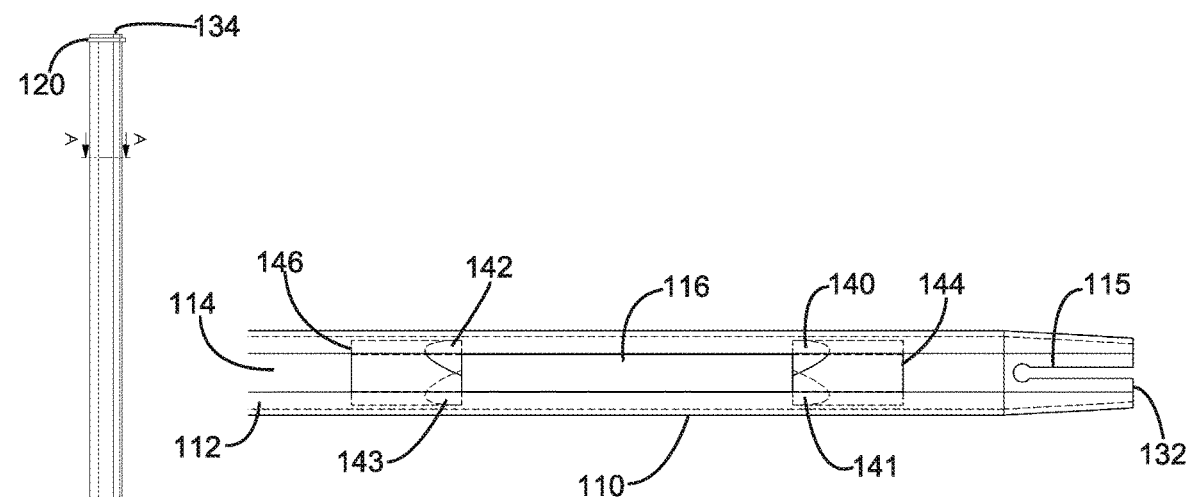
Figure 3:
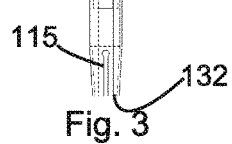
FIG. 3 is a schematic cross section through a friction stabilizer in accordance with the present invention.
Figure 5:
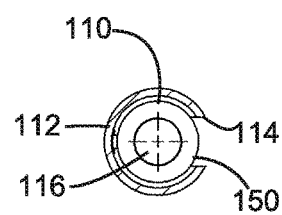
FIG. 5 is a cross section through line A-A of FIG. 3.

FIG. 3 shows a schematic arrangement of the friction stabilizer 110 of the present invention, which can be readily contrasted to the prior art arrangement of FIG. 2.

The friction stabilizer 110 has a sheath 112 which extends from an inner end 132 to an outer end 134. At the outer end 134 the sheath is coupled to a clamping plate 120. In the embodiment shown the sheath is around 2.4 m in length.

At the inner end 132 the sheath 112 is inwardly tapered to assist in installation. The sheath 112 has a longitudinal slit 114 extending along the length of the sheath 112 from the inner end 132 to the outer end 134. The sheath has an additional keyhole slit 115 diametrically opposed to the longitudinal slit 114. The keyhole slit 115 extends from the inner end 132 about 70 mm along the axial length of the sheath 112.

The sheath 112 has an internally positioned first fixed wedge 140 located near the inner end 132 and an internally positioned second fixed wedge 142 axially spaced from the first fixed wedge 140. In the embodiment of the drawings the first fixed wedge 140 is located about 125 mm from the inner end 132, and the second fixed wedge 142 is spaced from the first fixed wedge 1040 by about 300 mm. In other words, the first fixed wedge 140 is axially spaced from the inner end 132 by about 5% of the length of the sheath 112, and the second fixed wedge 142 is axially spaced from the inner end 132 by about 18% of the length of the sheath 112. It is considered that relative spacings from the inner end 132 of up to 10% and up to 25% respectively of the length of the sheath will provide a useful result.

The sheath 112 has an internally positioned third fixed wedge 141 diametrically opposed to the first fixed wedge 140, at the same axial location. The sheath 112 has an internally positioned fourth fixed wedge 143 diametrically opposed to the second fixed wedge 142, at the same axial location as the second fixed wedge 142.

The first fixed wedge 140 and the third fixed wedge 141 taper towards the inner end 132 of the sheath 112. The second fixed wedge 142 and the fourth fixed wedge 143 taper in the opposite direction; that is, towards the outer end 134.

The sheath 112 has a circumferential slit (not shown) located between the first fixed wedge 140 and the second fixed wedge 142.

Where the inner rod 16 of the prior art extends from its clamping plate 20 to its inner end 22, the arrangement of FIG. 3 has an inner rod 116 which extends from a first end 144 over a distance of about 300 mm to a second end 146. The entire inner bolt 116 is located near the inner end 132 of the sheath 112, remote from the clamping plate 120.

Figure 6:
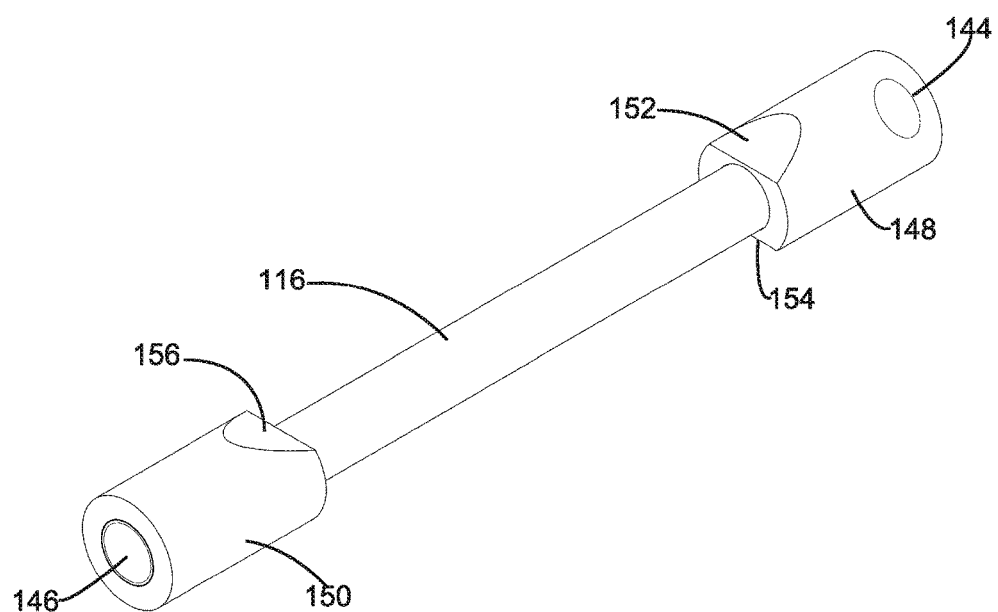
FIG. 6 is a perspective of an internal rod from within the friction stabilizer of FIG. 3.
Figure 7:
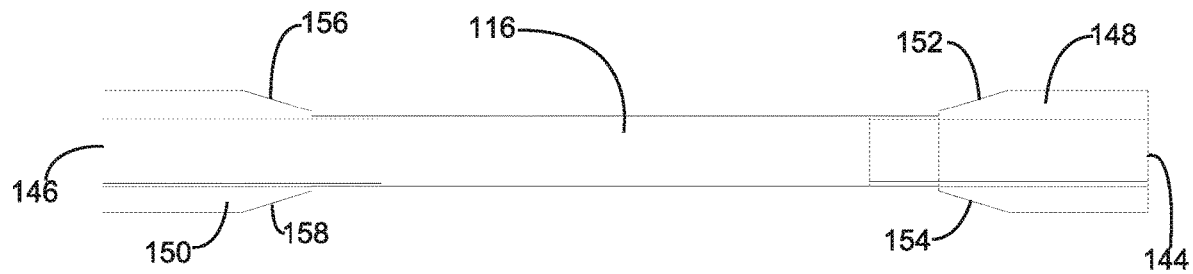
FIG. 7 is a schematic cross section through the internal rod of FIG. 6.

The inner rod 116 is shown in FIGS. 6 and 7.

The first end 144 of the inner rod 116 has a first engaging wedge member 148 mounted thereon. The second end 146 of the inner rod 116 has a second engaging wedge member 150 mounted thereof. The first engaging wedge member 148 has two diametrically opposed tapering surfaces: a first engaging wedge 152 and a third engaging wedge 154. The second engaging wedge member 150 has two diametrically opposed tapering surfaces: a second engaging wedge 156 and a fourth engaging wedge 158. The tapering surfaces (forming the four engaging wedges 152, 154, 156, 158) are each oriented at an angle of about 18° relative to a longitudinal axis of the inner rod 116.

The first engaging wedge 152 and the third engaging wedge 154 taper towards the second end 146 of the inner rod 116. The second engaging wedge 156 and the fourth engaging wedge 158 taper towards the first end 144 of the inner rod 116. In other words, the first and second engaging wedge members 148, 150 taper towards each other; that is, they are in opposite orientations.

The inner rod 116 is formed primarily from a 300 mm length of 20 mm diameter rod, which is threaded at either end. The first engaging wedge member 148 and the second engaging wedge member 150 are each formed from 35 mm diameter collars which have an internally threaded bore. The arrangement is such that the internally threaded bores of the first and second engaging wedge members 148, 150 are arranged to engage with the threads of the inner rod 116.

The friction stabilizer 110 is assembled by positioning the inner rod 116 within the sheath 112 such that the first engaging wedge 152 locates against the first fixed wedge 140, the second engaging wedge 156 locates against the second fixed wedge 142, the third engaging wedge 154 locates against the third fixed wedge 141, and the fourth engaging wedge 158 locates against the fourth fixed wedge 143.

The arrangement is such that when the sheath 112 is placed into tension (for instance, during a seismic event) it will fail at the slit. In this event, all tensile force will pass through the inner rod 116, and be dissipated through the engagement of first to fourth engaging wedges 152, 156, 154, 158 with first to fourth fixed wedges 140, 142, 141, 143 respectively.

The clamping plate 120 has a high tensile weld ring in its inner side.

Although the invention has been described with use of a rigid rod 116, it will be appreciated that other bolts such as a twisted cable bolt could be used to the same effect.

Modifications and variations as would be apparent to a skilled addressee are deemed to be within the scope of the present invention.

The invention claimed is:

1. A friction stabilizer having an outer sheath and an internal rod, the sheath including at least a first internally directed fixed wedge and a second internally directed fixed wedge,
   the first and second fixed wedges being axially spaced from each other,
   the first and second fixed wedges being oriented in opposing directions,
   wherein the rod extends between the first and second fixed wedges;
   the rod having a first end including a first engaging wedge and a second end having a second engaging wedge,
   the arrangement being such that a tensile force applied to the sheath causes a wedging action of the first engaging wedge against the first fixed wedge and the second engaging wedge against the second fixed wedge and
   wherein the sheath has a designated yield point located between the first and second fixed wedges.

2. The friction stabilizer as claimed in claim 1, wherein the designated yield point is a partial or complete cut through the sheath.

3. The friction stabilizer as claimed in claim 1, wherein the sheath has a third fixed wedge diametrically opposed to the first fixed wedge.

4. The friction stabilizer as claimed in claim 3, wherein the rod has a third engaging wedge diametrically opposed to the first engaging wedge, such that the tensile force causes a wedging action of the third engaging wedge against the third fixed wedge.

5. The friction stabilizer as claimed in claim 4, wherein the sheath has a fourth fixed wedge diametrically opposed to the second fixed wedge.

6. The friction stabilizer as claimed in claim 5, wherein the rod has a fourth engaging wedge diametrically opposed to the second engaging wedge, such that the tensile force causes a wedging action of the fourth engaging wedge against the fourth fixed wedge.

7. The friction stabilizer as claimed in claim 1, wherein the internal rod is constructed from high tensile steel, having a diameter of at least 10 mm.

8. The friction stabilizer as claimed in claim 7, wherein the internal rod has a 20 mm diameter.

9. The friction stabilizer as claimed in claim 1, wherein the internal rod is constructed from a twisted steel cable material.

10. The friction stabilizer as claimed in claim 1, wherein the internal rod is at least 100 mm in length.

11. The friction stabilizer as claimed in claim 10, wherein the internal rod is at least 200 mm in length.

12. The friction stabilizer as claimed in claim 11, wherein the internal rod has a length between 250 mm and 300 mm.

13. The friction stabilizer as claimed in claim 1, wherein the sheath has a diameter between 30 mm and 60 mm.

14. The friction stabilizer as claimed in claim 1, wherein the sheath has a wall thickness between 3 mm and 5 mm.

15. The friction stabilizer as claimed in claim 1, wherein the sheath has an inner end and an outer end, the outer end being associated with a clamping plate, and wherein the first and second fixed wedges are both located closer to the inner end of the sheath than the outer end.

16. The friction stabilizer as claimed in claim 15, wherein the first fixed wedge is located within 10% of the sheath length from the inner end.

17. The friction stabilizer as claimed in claim 15, wherein the second fixed wedge is located within 25% of the sheath length from the inner end.

* * * * *